Jan. 23, 1940.  B. J. CRAIG  2,187,936
AUTOMOTIVE VEHICLE DOOR LATCH
Filed April 7, 1939  6 Sheets-Sheet 1
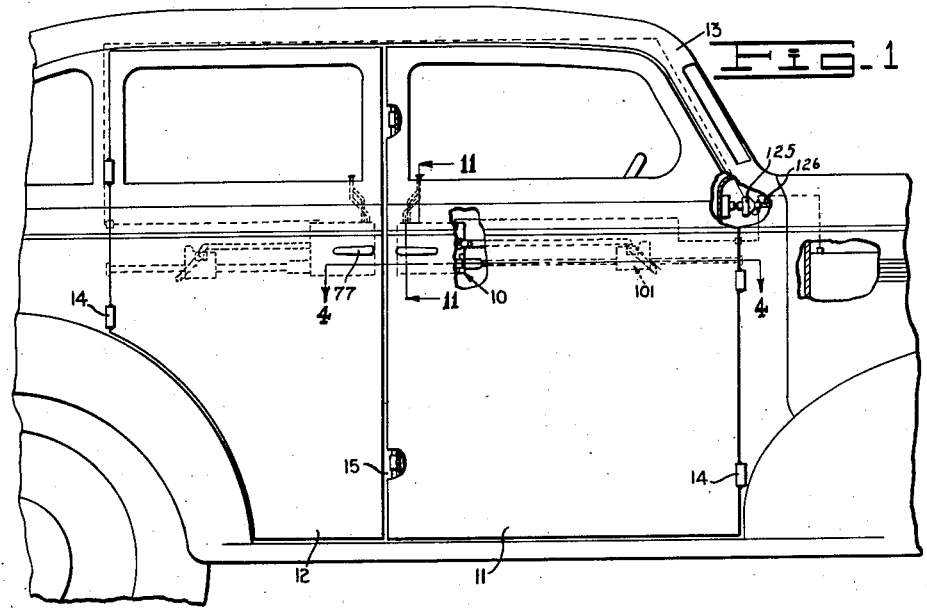
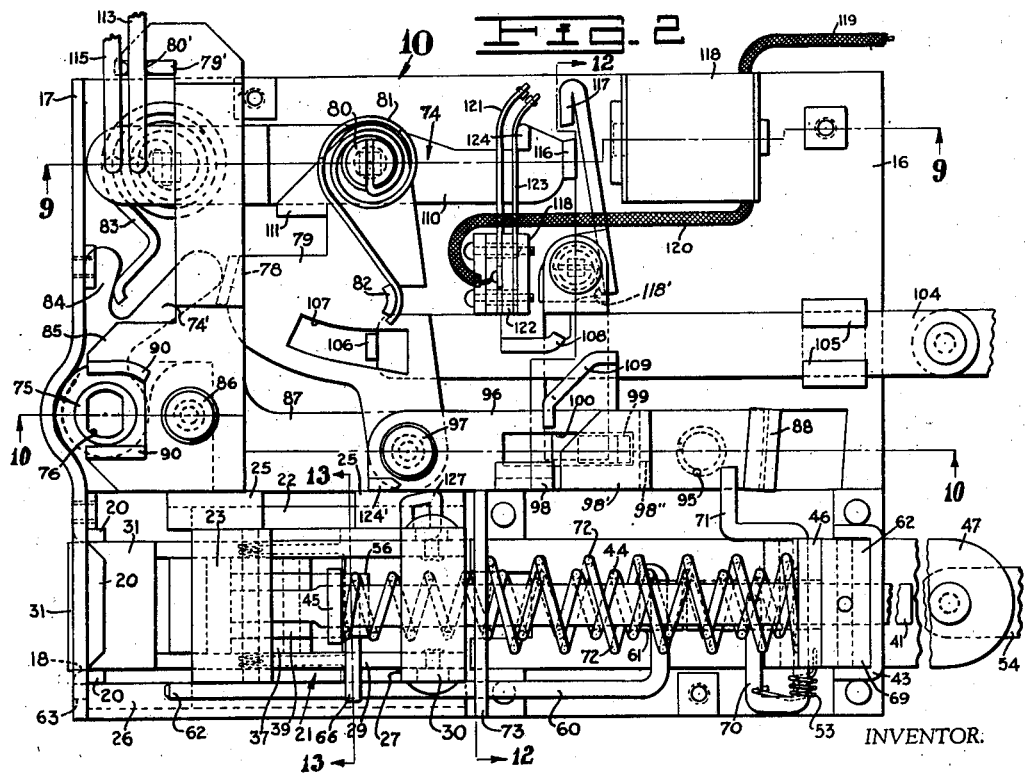
INVENTOR.
B. J. Craig

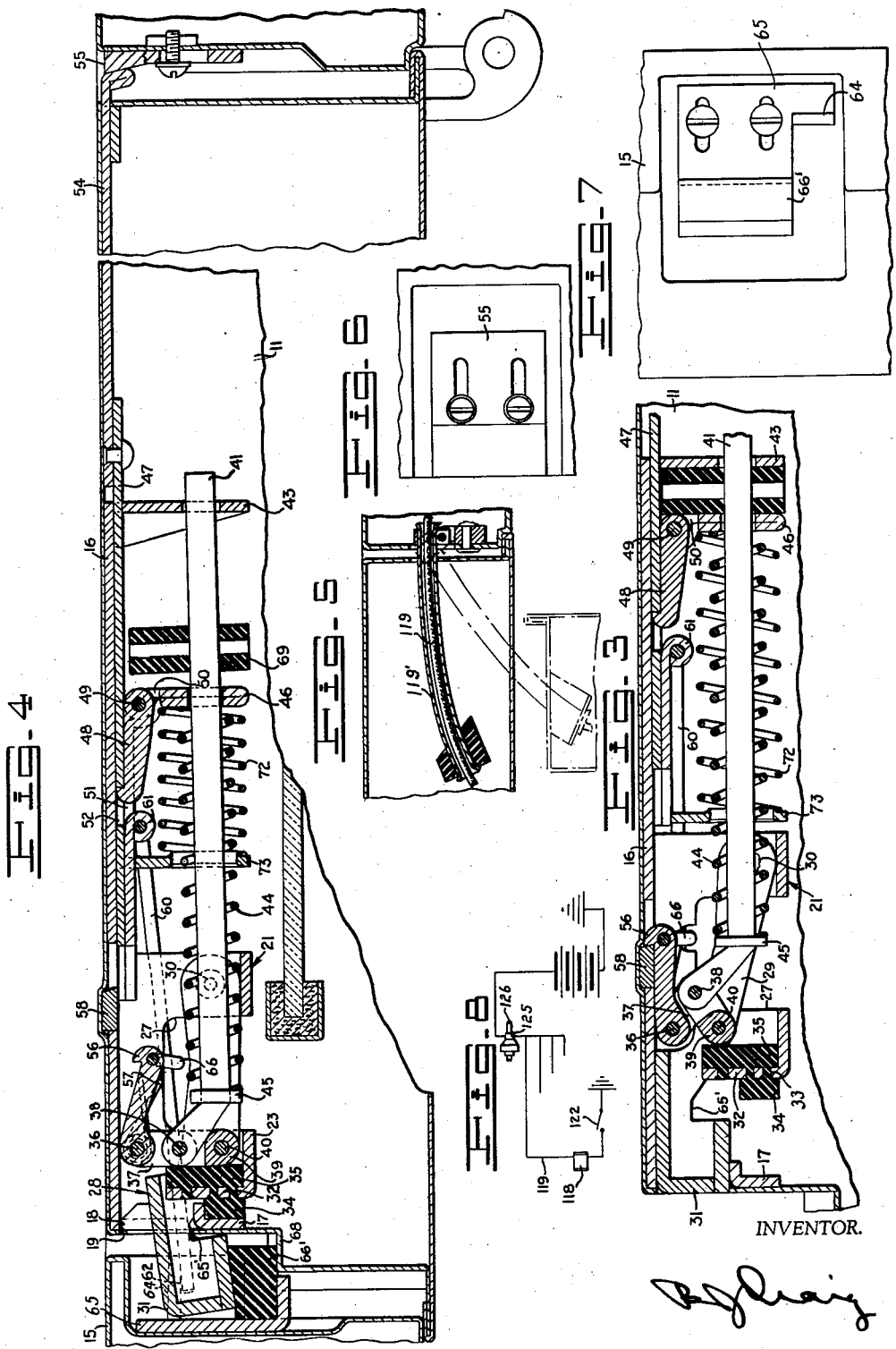

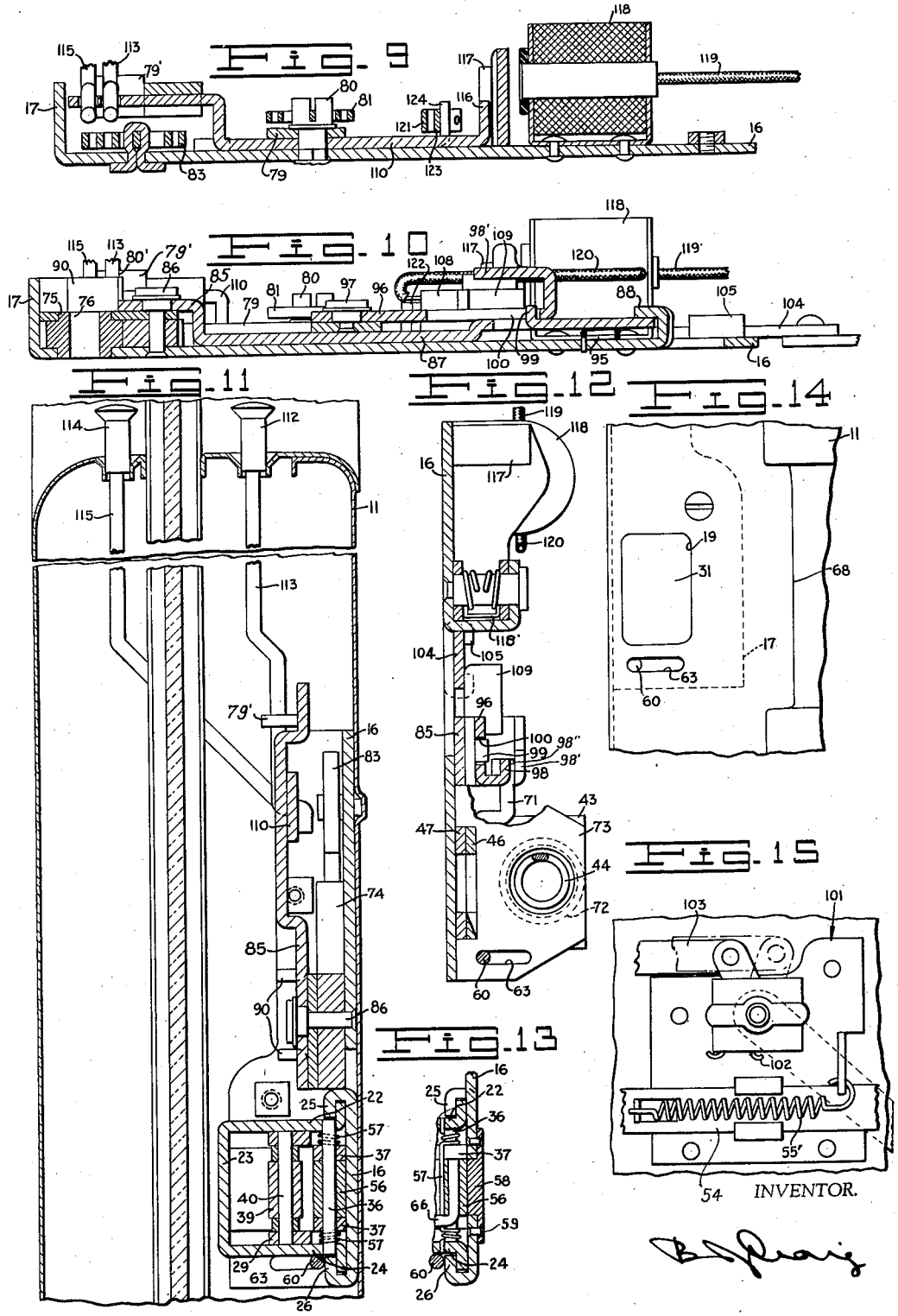

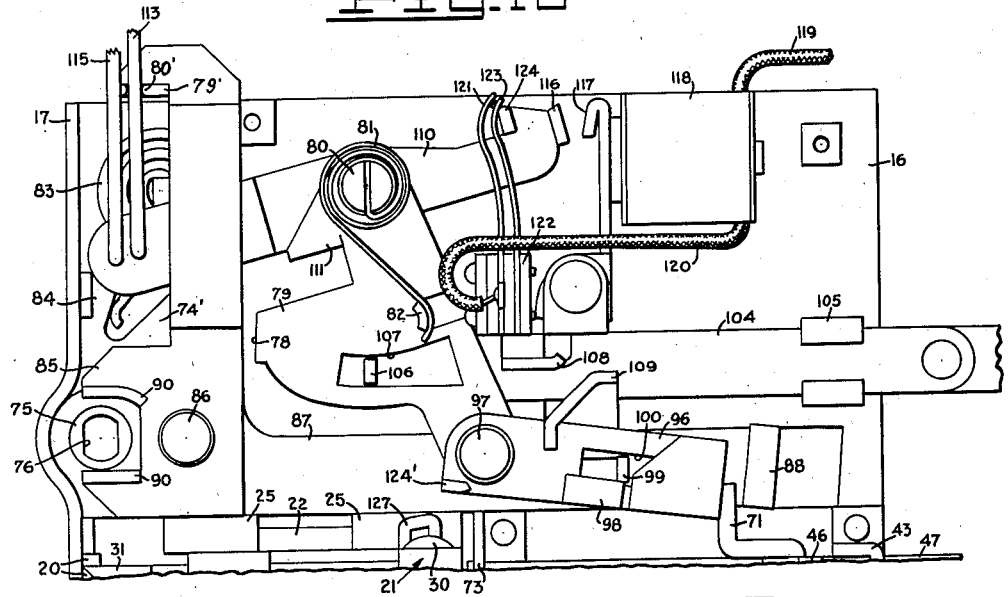

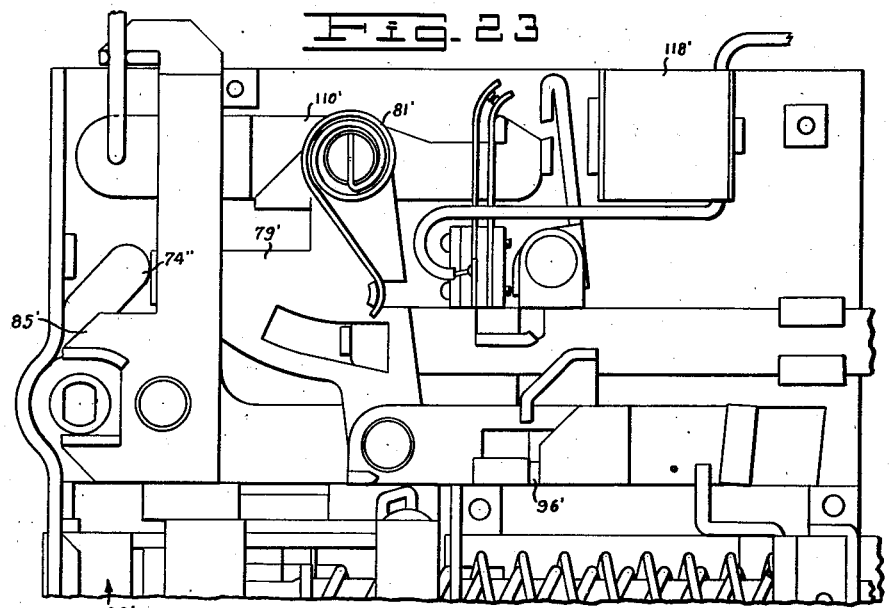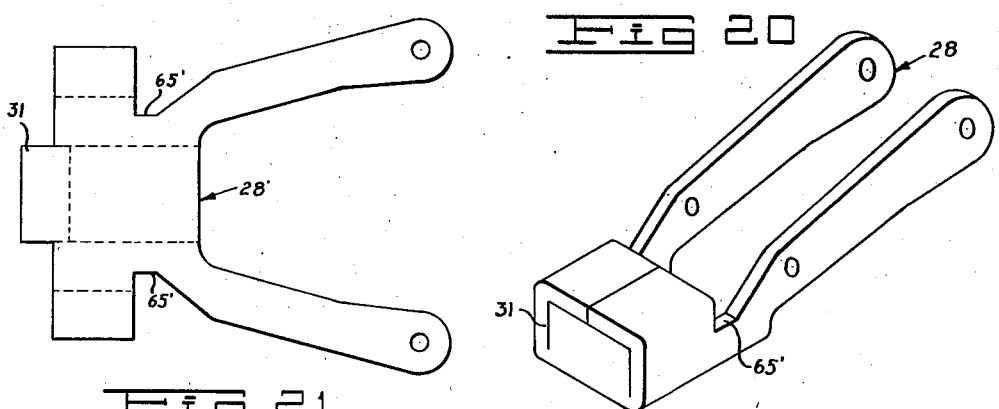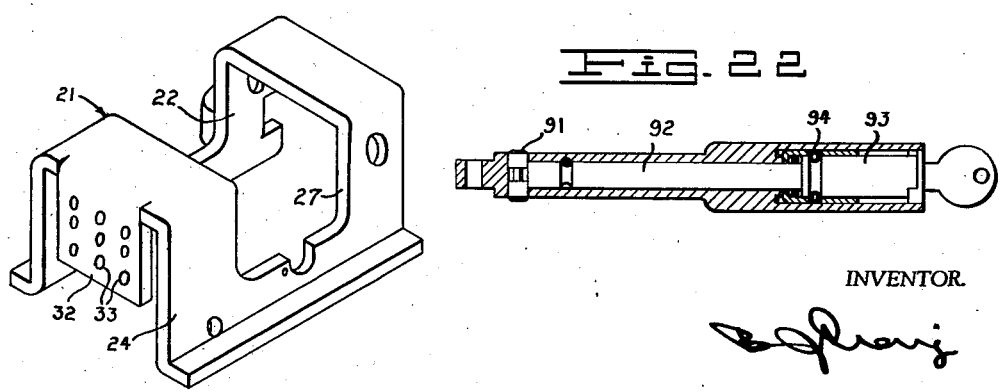

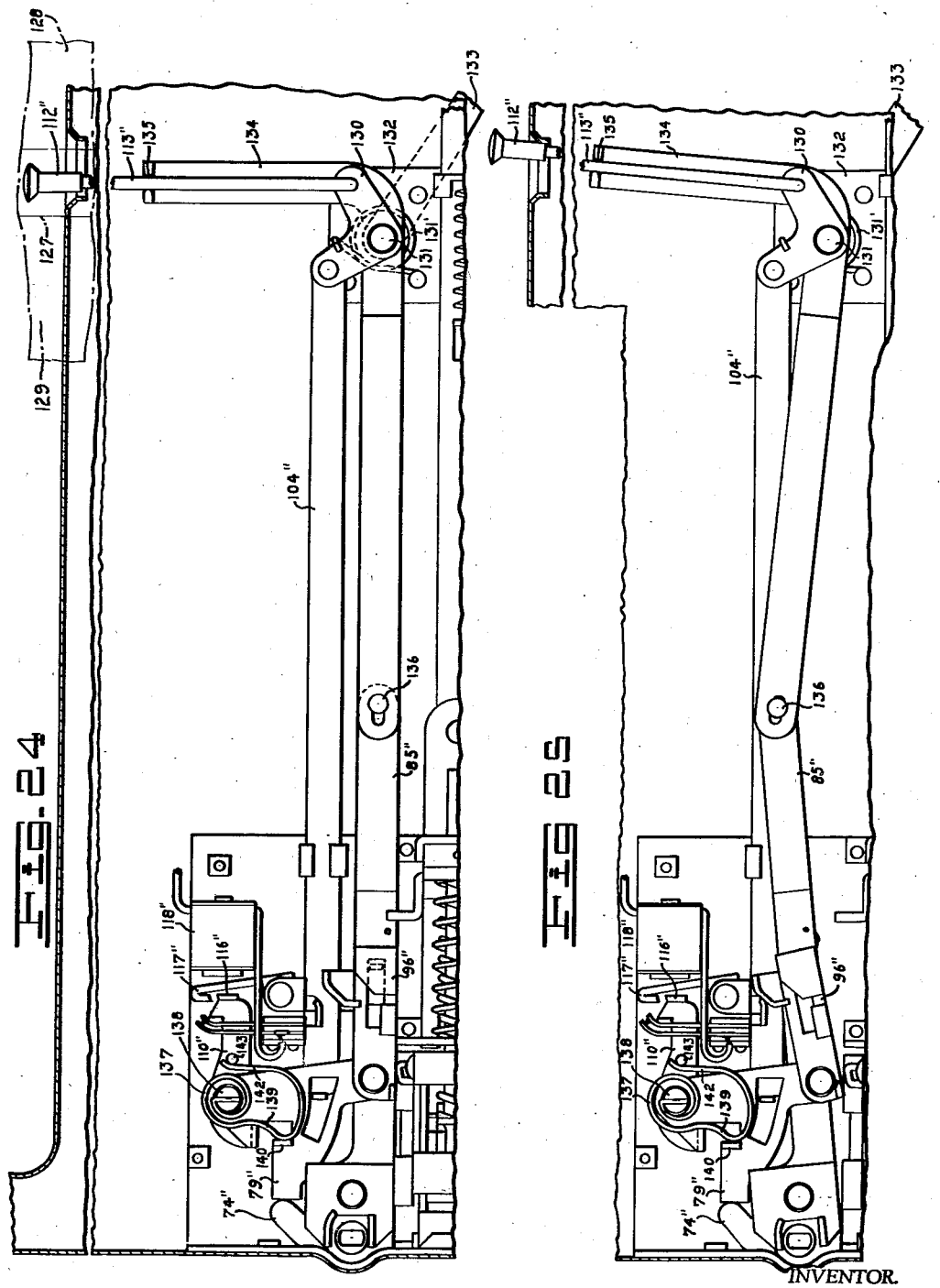

Patented Jan. 23, 1940

2,187,936

UNITED STATES PATENT OFFICE 2,187,936

AUTOMOTIVE VEHICLE DOOR LATCH

Burnie J. Craig, Los Angeles County, Calif.

Application April 7, 1939, Serial No. 266,525

46 Claims. (Cl. 180—82)

This invention relates to door latching and control mechanism which is particularly, although not exclusively, adapted for use in connection with the doors of automotive vehicles, a general object being to provide a novel construction having cooperating parts adapted to be mounted upon the door and/or frame and/or body pillar with the parts acting in improved and effective manner to enable a door to be closed and latched quietly and to be readily opened.

A more specific object of the invention is to provide a control mechanism for an automotive vehicle door whereby the passenger may settle himself comfortably and then swing the door without slamming action to a position where the door is almost closed whereupon the bolt will move to advanced position and thereafter the door will be quietly moved to fully closed position by further movement of the bolt which latter may be energized and/or controlled by movement of the door. The automatic closing action avoids slamming and occurs after the door is so near its final position that there is no opportunity for the hand or fingers to be pinched.

Automotive vehicle doors, due to manufacturing tolerances permitted, are somewhat loosely mounted and are usually held in tightly latched position against one or more bumpers or cushions to prevent rattling. This has required that the door be moved to latching position against a strong force exerted by the resilient cushions which tends to open the door and since the cushions are compressed only momentarily upon impact with the door, the latch bolt must be quickly projected otherwise the cushion forces the door open before the bolt is in fully engaged position.

This has required the use of a very strong spring for urging the bolt to latching position and as a result considerable effort is required to cause the bolt to be retracted so that it may pass over the strike before snapping into engaged position and again to retract the bolt by operation of the handle in opening the door. If a weak spring is employed for the bolt the latter may not move to fully engaged position while the cushion is compressed so that the door handle sags and consequently the roll back may not function smoothly and various means have been proposed seeking to overcome this objection.

It is an object of the present invention to provide novel latch means for the doors of automotive vehicles which overcomes or minimizes the objections noted and which in addition has other advantages.

It has also been found objectionable that should the inside door operating handle be arranged for release under light pressure children or others may open the door with consequent liability of falling from the vehicle and one of the objects of the present invention is to provide a latching means including bolt release means which is operable under light pressure such as could be exerted by the finger tips when the vehicle is at rest but which will be practically ineffective to release the bolt when the vehicle is moving. Many people object to being locked within a vehicle and therefore the present invention includes provision for what may be termed an emergency release of the bolt under considerable pressure such as could be exerted by the hand with the operation requiring more force than could be exerted by a child or by a finger tip pressure so that uncomfortable feeling of riders at being locked within the vehicle is avoided while at the same time opening of the door is secured with the greatest ease when such opening is safe.

The present invention further contemplates the use of a resilient striker for the latch bolt. In the construction shown in the accompanying drawings the door is so mounted relative to the resilient striker that a portion of the door may engage one face of the striker while the latch bolt engages an opposed face of the striker and is moved towards the striker to thus compress the striker between the door and the bolt. With previous latch constructions rubber strikers have been impractical where sliding bolts are employed due to the friction produced when the bolt is withdrawn but with the present invention wherein the bolt shifts before moving laterally friction is so reduced or removed that a rubber striker may be employed to provide silent operation and resilient support for the door when the latter is latched.

The usual sliding latch bolt requires lubrication to allow ready disengagement and as the bolt is advanced when the door is open the person and clothing of the occupant is frequently soiled. With the present invention this difficulty is overcome since the bolt has a blunt forward end and is of a size to completely fill the slot through which it slides and the bolt is never advanced until the door is almost closed. Further since the bolt does not slide across its strike there is no need for lubrication of either the strike or the bolt.

The general object of the invention is therefore to provide an improved latch construction for automotive vehicle doors permitting quiet and positive latching and ready opening.

A more specific object of the invention is to provide a novel automotive vehicle door latching mechanism wherein improved means is provided for causing the latch bolt to move to and/or from latched position.

Another object of the invention is to provide a novel mechanism energized by door movement for moving an automotive vehicle door bolt to and/or from engaged position.

Another object of the invention is to provide a novel speed controlled latch bolt for an automotive vehicle door.

Another object of the invention is to provide a novel vehicle speed controlled release for an automotive vehicle door latch bolt and wherein the bolt is locked against release upon performing certain operations and shutting the door or by locking the door with a key.

A further object of the invention is to provide a novel automotive vehicle door latch bolt moving means and novel control means coacting therewith.

A further object of the invention is to provide a novel finger tip controlled automotive vehicle door latch.

Another object of the invention is to provide a novel means for controlling a movement of the latch bolt of an automotive vehicle door latch.

Another object of the invention is to provide a novel latch bolt for the door of an automotive vehicle.

A further object of the invention is to provide a novel combined closing and latching mechanism for the door of an automotive vehicle.

An additional object of the invention is to provide an automotive vehicle door latch mechanism including a novel bolt construction.

A further object of the invention is to provide a novel spring operated control for the latch bolt of the door of an automotive vehicle.

A further object of the invention is to provide a latch including locking means and wherein a single member may be operated to either lock the bolt or to release the bolt.

An additional object of the invention is to provide a novel striker for an automotive vehicle latch bolt.

Other objects and the advantages of my invention will be apparent from the following description taken in connection with the accompanying drawings, wherein:

Fig. 1 is a side elevation with parts broken away showing an automotive vehicle with the present invention applied thereto;

Fig. 2 is a side elevation showing the latch;

Fig. 3 is a fragmentary central sectional view showing the bolt member in retracted position;

Fig. 4 is a fragmentary central sectional view showing the bolt in advanced position;

Fig. 5 is a fragmentary detail showing the manner in which the lead wire passes from the door frame to the door;

Fig. 6 is a fragmentary elevation showing the push block;

Fig. 7 is a view similar to Fig. 6 showing the strike member;

Fig. 8 is a wiring diagram;

Fig. 9 is a section taken on line 9—9, Fig. 2;

Fig. 10 is a section taken on line 10—10, Fig. 2;

Fig. 11 is a section taken on line 11—11, Fig. 1;

Fig. 12 is a section taken on line 12—12, Fig.

Fig. 13 is a fragmentary section taken on line 13—13, Fig. 2;

Fig. 14 is a fragmentary edge view of the door;

Fig. 15 is a fragmentary side elevation showing the remote control and associated parts;

Fig. 16 is a fragmentary side elevation of the latch showing the position assumed when the bolt is released by the finger tip control member;

Fig. 17 is a fragmentary side elevation of the latch showing the position assumed when the bolt is released by the outside door handle;

Fig. 18 is a fragmentary side elevation showing the latch in locked position;

Fig. 19 is a plan of the blank from which the bolt is formed;

Fig. 20 is a perspective view showing the formed bolt;

Fig. 21 is a perspective view showing the bolt carriage;

Fig. 22 is a sectional view of the key operated lock;

Fig. 23 is a side elevation of a modification wherein the outside finger tip control is omitted;

Fig. 24 is a side elevation showing a further slight modification of the latch which is particularly adapted for use on the front doors of automotive vehicles and showing the latch bolt in retracted position; and Fig. 25 is a view similar to Fig. 24 showing the latch in locked position.

In the accompanying drawings the invention is shown as embodied in an automotive vehicle door latch which is indicated generally at 10. A latch is shown as mounted upon each front door 11 and each rear door 12 of a sedan type automotive vehicle 13 wherein the doors are mounted on hinges 14 for movement towards and from body pillars 15.

As shown in the drawings the latches 10 upon the front doors 11 and the rear doors 12 are identical with each other except that they are rights and lefts and that the key actuated lock is omitted on the rear doors. In the automotive vehicle industry as in other industries improvements of merit are sometimes slow to be accepted by the public and abrupt changes are to be avoided. For this reason the use of outside door handles, later described, on the rear doors would probably be desirable although unnecessary as they would be seldom, if ever, used except possibly as door pulls. The outside door handle on the left front door could also be omitted. The curb side outside door handle is necessary when the lock is associated therewith as shown in the drawings and also would serve as an emergency means for opening the door.

Many passengers object to riding in an automotive vehicle with doors which are locked when the vehicle is running and for this reason inside hand operated door handles for use in an emergency are desirable although with the construction described herein would be seldomed used.

The latch 10 includes a base plate 16 suitably secured to the rear wall of the vehicle door and has a selvage plate 17 bent therefrom with the latter plate having a rectangular bolt opening or slot 18 therein which is aligned with a slot 19 in the door edge. The inner edge of the slot 18 is defined by the plate 16 while the other edges include guide tongues 20 bent inwardly from the selvage plate.

The latch bolt includes a carriage 21 (see Figs. 4 and 21) having a flanged top 22, a side 23 and a flanged bottom 24. The flange on the top 22 is slidable between tongues 25 bent from the plate 16 while the flange on the bottom 24 is slidable beneath a tongue 26 folded from the edge of the plate 16. The intermediate portion of the carriage is cut away as at 27.

The carriage supports a bolt indicated generally at 28 (see Figs. 3, 4 and 20) which includes sides 29 pivoted at 30 to the carriage, and a hollow head 31 which slides on the plate 16. As shown the forward end 32 of the carriage includes apertures 33 through which portions of a rubber cushion member extend. One portion 34 of the cushion (when the bolt is advanced) engages the selvage plate 17. The inner portion 35 of the cushion engages a toggle to be later described.

A pin 36 on the carriage supports a pair of toggle links 37 which are connected by a pin 38 with a second pair of toggle links 39 mounted on a pin 40 supported on the forward portion of the bolt. The construction is such that the carriage and the bolt must be first advanced before the toggle can be straightened to shift the bolt head 31 about its pivot 30.

In order to advance the carriage and bolt the forward end of a rod 41 engages the toggle pin 38 while the rear end of the rod passes throughout an apertured bracket 43 suitably mounted on the plate 16. The forward end of a spring 44 which surrounds the rod 41 engages a suitable stop member 45 on the rod. The rear end of the spring 44 engages a movable L-shaped abutment member 46 which reciprocates on a slide 47 and is apertured to receive the rod 41. A dog 48 mounted on a pin 49 supported by tongues 50 on the abutment member extends through a slot 51 in the abutment member and engages in the end of a slot 52 in the slide so that when the latter is moved forward the abutment member is advanced thus compressing the spring 44. A spring 53 normally urges the dog 48 to engaged position.

A bar 54 is secured at one end to the slide 47 and at its other end engages an adjustable plate or push block 55 on the door frame and as the door is closed the bar 54 is shifted to compress the spring 44. The bar 54 is guided by means on the remote control which will be later described. A spring 55' engages the remote control base and the bar 54 to restore the latter to normal position as the door is opened through a portion of its swing.

The action of the spring 44 tending to advance the bolt and its carriage is arrested by a dog 56 mounted on the outer toggle pin 36 and normally urged to engaged position by a spring 57. The dog 56 engages a hardened stop 58 shown as held in place by rivets 59 secured on the plate 16.

In order to release the dog 56 when the spring 44 has been sufficiently compressed and the door is almost closed, a release arm 60 is mounted to turn on a tongue 61 bent from the abutment member 46. The forward end 62 of the arm 60 when the bolt is retracted (Fig. 2) is remote from the selvage plate 17 but advances with the abutment member 46 so that when the abutment member is fully advanced (Fig. 4) and the spring 44 compressed the end 62 projects through a slot 63 in the selvage plate 17 and is free to strike a tongue 64 bent from a striker plate 65 thus rocking the arm and causing it to engage and shift a projecting pin 66 on the dog 56 thus releasing the latter.

Release of the dog 56 allows the carriage 21 to be pushed forward by the spring 44 until the bumper portion 34 engages the selvage plate. The bolt sides 29 are each notched as at 65' so that when the bolt is fully advanced the notches are in alignment with the edge of the door and with the selvage plate 17. In this position the bolt is free to be shifted laterally when the toggle is straightened until the latter engages the cushion portion 35.

The arm 60 does not release the dog 56 until after the outer face of the bolt has passed the inner face of a striker 66' on the striker plate 65. When the bolt shifts laterally its outer face engages the inner face of the striker and the movement of the bolt moves the door to fully closed position. A portion 68 on the door is disposed in the path of the striker and engages the outer face of the striker as the door becomes fully closed and thus the striker is clamped tightly between the bolt head and the portion 68 on the door.

The striker is preferably made of resilient material, such as rubber, and thus the striker serves not only as a striker but also as a cushion tending to reduce vibration and limit body weaving while permitting a quiet closing and ready opening of the door.

When in retracted position the outer end of the bolt is flush with the outer edge of the door so that there is no projecting portion to rub against the clothing or person of the passenger. Also as the bolt does not slidably engage its striker it is unnecessary to lubricate the striker or the bolt so that there is no exposed lubricant. Further as there is no sliding action while under pressure between the bolt head and striker to cause wear the bolt head need not be a separately formed hardened piece but may be made integral with the remainder of the bolt as a one piece stamping.

A bumper 69 made of rubber is securely mounted on the rod 41 between the end of the abutment 46 and the bracket 43. When the bolt is fully advanced the bumper 69 is spaced from the abutment (see Fig. 4) so that the full effect of the spring 44 is available for straightening the toggle. The spring 44 is of such a nature and is so loaded that when released it maintains the toggle firmly in the straightened position.

In order to release the dog 48 and thus free the abutment the pin 49 on which the dog 48 is mounted includes a bent end 70 which fits in a hole in the dog to prevent relative turning between the dog and the pin. The other end of the pin includes an end portion 71 bent to lie in the path of a cam release member to be later described.

In order to push the abutment 46 rearwardly a spring 72 is employed which is disposed about the spring 44 and which has its pitch reversed with respect to the spring 44. At one end the spring 72 engages the end of the abutment 46 and at the other end engages an apertured bracket 73 mounted on the plate 16. The rod 41 and the spring 44 thereon freely pass through the aperture in the bracket 73.

When the dog 48 is tripped to release the abutment member from the slide 47 the abutment member is pushed rearwardly by the spring 72 thus causing the abutment member to first engage the bumper 69 after which the continued action of the spring 72 moves the abutment member and bumper rearwardly thus carrying the rod 41 rearwardly. This action first results in breaking the toggle and thereby shifting the bolt laterally after which the continued push exerted by the spring 72 on the rod 41 acting through the toggle links and bolt pulls the carriage 21 rearwardly so that the bolt and the carriage are moved to retracted position. The spring 72 is compressed upon closing the door by the abutment member being moved by the slide 47 as previously described.

The release mechanism indicated generally at 74 includes a roll back 74' mounted on a sleeve 75 rotatable on the plate 16. The sleeve 75 has a hole 76 therethrough which is defined by parallel sides and arcuate ends which are adapted to receive a similarly shaped end on a hand operated handle 77. The roll back 74' engages a tongue 78 bent up from an arm 79 pivoted on a pin 80 secured to the plate 16 and which is urged towards the roll back by a spring 81 shown as arranged in a slot in the end of the pin 80. The spring engages a tongue 82 bent from the arm 79. A spring 83 on the plate 16 engages a tongue 84 integral with the roll back 74'.

The spring 81 is relatively light as compared to the spring 83, the spring 81 being of such character that it can be overcome by light pressure on a finger tip controlled member which will be later described while the spring 83 is such that considerable force such as would be exerted by the action of the hand of an average adult on the handle 77 is necessary to overcome this latter spring.

The release mechanism 74 includes a control lever 85 pivoted at 86 to a raised member on the roll back support. The control lever shown is of bell crank shape and one end 87 extends beneath the arm 79 and beneath a tongue 88 bent from the plate 16.

The other end of the control lever extends upwardly over the arm 79 and includes a tongue 79' having a slot 80' therein. The lever 85 adjacent the roll back includes wings 90 engageable with an eccentric pin 91 of a spindle lock shaft 92 which is of usual construction including a lock barrel 93. The lock shaft may be turned in either direction by a key and when released is returned by a spring 94. The normal unlocked position is shown in Fig. 2.

When the lock shaft is rotated from this position the eccentric pin pushes the lower wing down thus raising the end 87 of the control lever. A reverse movement of the key reverses the direction of movement of the control lever. The details of the key operated lock form no part of the present invention and other types of locks may be employed. A snap over spring 95 serves to complete the movement of the control lever and to hold the lever either in locked or unlocked position when the key is removed.

The arms 79 has an operating link 96 pivoted thereto at 97 which includes a cam portion 98 which in one position moves beneath the portion 71 of the pin 49 and thus shifts the dog 48 to release the abutment member.

A tongue 99 on the control lever 85 passes through a slot 100 in the link 96 thus allowing the link to move along the control lever while also serving to shift the link 96 about its pivot when the control lever is shifted about its pivot. Thus the free end of the link may be moved so that the cam 98 moves into or out of the path of the portion 71 of the pin 49 when the control lever is shifted by the key action or by other means to be later described.

The latch includes an inside hand operated remote control 101 (Fig. 15) which is urged to normal position by a spring 102. The remote control includes an arm 103 which is connected to a bar 104 slidable beneath tongues 105 on the plate 16. The bar 104 is in the same plane as the end 87 of the control lever 85 and has a forward portion which is disposed below the arm 79 and which includes a tongue 106 slidable in a slot 107 in the arm. The bar 104 includes a cam shoulder 108 adapted to engage a corresponding shoulder 109 on the lever 85.

When the remote control is operated with parts in the position shown in Fig. 2 the rod 104 is moved from the normal position shown in this figure until the tongue 106 engages the end wall of the slot 107 and thereafter rocks the arm 79 and shifts the operating link 96 to releasing position.

The free end of the operating link is bent back as at 98' and includes a notch 98'' through which the portion 71 of the release pin passes when the spring 44 is being compressed. The portion 98' prevents accidental release of the dog 48 until the cam 98 is advanced. When the cam 98 rocks the dog 48 the portion 71 is raised and passes rearwardly over the portion 98'.

Should the lever 85 be in the raised or locked position (see Fig. 18) when the remote control shifts the rod 104 the first movement of the rod will cause the cam shoulder 108 to engage the shoulder 109 and by the resulting camming action rock the end 87 of the lever 85 downwardly thereby moving the operating link 96 to unlocked or releasing position. This rocking of the lever 85 occurs prior to the engagement of the tongue 106 with the end of the slot 107 so that the cam 98 is in functioning position just prior to the time the link 96 is moved.

The remote control spring 102 is preferably of such character that the remote control handle can be operated only with the application of such force as would be exerted by some effort by an average adult and therefore could not be operated at all by a child. The force required to overcome the roll back spring 83 may be lighter than the spring which resists operation of the remote control. Thus by making the spring on the hand operated remote control relatively slightly stronger than the spring on the hand operated outside door handle full safety action is secured without undue force being necessary where its application does not increase the measure of safety.

In order to provide a finger tip control for releasing the bolt accessible from within or without the vehicle I provide a rocker arm 110 which is pivoted on the pin 80 and which normally engages a tongue 111 on the arm 79. The arm 110 is adapted to be rocked by an inside finger tip operated push button 112 on a rod 113 or by a finger tip operated push button 114 which is exterior of the door and which is on a rod 115. The rods 113 and 115 have their ends arranged in apertures in the rocker arm 110 and the rod 113 passes through the slot 80' in the tongue 79'. The construction is such that when either the push button 112 or the push button 114 is pushed the arm 110 will be rocked and by its engagement with the tongue 111 will rock the arm 79 thereby shifting the link 96 to bolt releasing position.

It will be noted that operation of the hand operated roll back or of the hand operated inside remote control to rock the arm 79 will not disturb the rocker arm 110 since the tongue 111 will merely move away from the rocker arm without shifting the latter.

In order to prevent release of the bolt by actuation of the finger tip operated push buttons when the vehicle is running the arm 110 is provided, at the end remote from the push button rods, with a tongue 116 whose path of movement causes it to engage the bent over portion 117 of the armature of an electro-magnet 118 when the circuit of the latter is open. A spring 118' normally holds the armature in the position shown in Fig. 2.

One terminal of the electro-magnet 118 is connected by a wire 119 which as shown passes through a tube 119' which serves as a door check and is connected to the vehicle battery and the other terminal of the magnet is connected by a wire 120 to one resilient arm 121 of a switch 122. The other resilient arm 123 of the switch is spaced from the arm 121 and is grounded on the plate 16. The arm 121 is insulated from the plate. The rocker arm 110 includes a tongue 124 which, when the arm 110 is rocked by either of the finger tip controls, cams the arms 123 against the arm 121 so that the circuit is closed thereby energizing the electro-magnet 118 whereupon the armature 117 is withdrawn from the path of the tongue 116 permitting the arm 110 to be fully rocked.

The lead 119 to the battery extends through a circuit closing member 125 which is associated with a suitable speed control member which may be any suitable member influenced by speed of the vehicle, although it is here shown as associated with the speedometer cable 126. The speed control member is of such character that it maintains the circuit open when the vehicle is moving or when the speed of the vehicle is greater than a predetermined rate. Such a control member is shown in detail and fully described in applicant's copending application, Serial No. 206,534, filed May 7, 1938.

As stated the push button rod 113 passes through the slot 80' in the upper portion of the control arm 85 so that when the control arm is shifted to locked position by the action of a key the finger button rod is shifted to the position shown in Fig. 18. The finger tip button 112 may be employed to shift the control arm. From the foregoing it will be seen that locking and unlocking is effected either by the action of the key or by action of the inside finger tip release member, and that unlocking is also effected by preliminary motion of the inside hand operated remote control.

In locking and unlocking operations the inside finger tip control rod merely shifts back and forth with the snap over spring 95 holding it in either position and this function of the finger tip control rod does not interfere with its other function of releasing the latch bolt when it is in unlocking position and is operated.

When the inside finger tip rod 113 is in locking position (Fig. 18) pushing down on the rod shifts the rocker arm when the vehicle is still and the electro-magnet has been actuated thus causing the cam 98 to move without striking the release portion 71 and even this movement is prevented by the tongue 117 when the vehicle is running. When the latch is in locking position and the vehicle is still, actuation of the release either by the hand operated outside handle or the outside finger tip operated button is ineffective to release the bolt although the necessary motion may be made and thus the desired "semi-free wheeling" of latch opening members is secured.

The spring 81 returns the arm 79, operating link 96 and rocker arm 110 to normal position after each operation.

To prevent unintentional locking of the door when the door is closed with the control lever 85 in locking position a cam member 127 may be bent from the carriage 21. This member engages a tongue 124' on the operating link 96 as the carriage is advanced and the lever 85 is moved to unlocked position.

This construction may also provide means for locking the door intentionally upon closing the door. To do this the control lever 85 is moved to locking position by shifting the push button 112 laterally. Thereafter, the outside door handle is turned to shift the operating link and thus shift the tongue 124' thereon out of the path of the cam 127. The door then being closed and the bolt advanced the cam 127 advances without striking the tongue 124 so that when the outside door handle is released the latch remains in locked position.

In operation when the bolt is in the position shown in Fig. 2 and the door is moved from a fully opened position towards a closed position the first movement of the door will move the block 55 towards the end of the bar 54 until the two engage. The bar and block are preferably so arranged that they engage when the door is approximately 30° open. The continued closing movement of the door causes the springs 44 and 72 to be compressed due to the movement of the abutment member 46.

The release arm 60 is advanced as the door is closed since it is carried by the abutment member and as the door closely approaches a fully closed position the arm 60 engages the tongue 64 thus rocking the arm and freeing the dog 56. This action allows the carriage 21 to be pushed forward until the bumper 34 on the carriage engages the selvage plate 17. In this position of the bolt the latter is free to shift about its pivot 30 so that the toggle action becomes effective to straighten the toggle, moving the bolt to the position shown in Fig. 4 where it engages one side of the striker with the other side of the striker shown as engaging the portion 68 on the door.

The movement of the bolt due to the toggle action moves the door to the fully latched position where it is held in this position due to the force of the spring 44 holding the toggle straightened against the cushion member 35.

When the door is closed as shown in Fig. 4 the latch may be locked to prevent release of the bolt by inserting a key and rotating the lock shaft thus moving the control lever 85 to the position shown in Fig. 18, which movement shifts the operating link 96 to locking position.

The control lever 85 may also be rocked to locking position by merely shifting the push button 112 to the position shown in Fig. 18.

When the latch bolt is locked by operation of the key or by shifting the inside push button, it may be unlocked by the key or it may be unlocked by shifting the inside push button to unlocking position. The bolt may also be released by actuation of the inside remote control handle which through the engagement of the shoulder 108 with the shoulder 109 restores the operating link 96 to unlocked position prior to the movement of the remote control to bolt releasing position.

When the door is closed and the bolt is in the position shown in Fig. 4 and the locking mechanism is in releasing position and the vehicle is running, operation of either push button 112 or 114 will cause the tongue 116 on the rocker arm 110 to engage the portion 17 of the armature of the magnet. When the vehicle is in motion and the circuit is maintained open by the speed responsive member there is no flow of current and thus the armature prevents release by means of either push button.

When the vehicle is running, however, the arm 79 is free to be rocked by the remote control so that the latter functions regardless of vehicle speed. The resistance offered to the release by the remote control member by springs 81 and 102, however, is such that the remote control can only be operated with difficulty. When the vehicle is running, or should for any reason the circuit to the solenoid cease to function when the vehicle is still, access may be had to the vehicle by operating the door handle 77 against the force of the springs 81 and 83.

When the vehicle is at rest or is moving so slowly that the circuit is closed through the speed influenced member pressure on either finger tip button 112 or 114 will cause the armature portion 117 to move from the path of the tongue 116 thus permitting a full movement of the rocker arm 110 to bolt releasing position. When the vehicle is at rest the latch bolt may also be released either by the outside door handle or the inside remote control.

In closing the door with the latch bolt in locking position (Fig. 18) the cam 127 engaging the tongue 124' restores the parts to unlocked position. If however the parts in the position shown in full lines in Fig. 18 are shifted by the outside door handle to the position shown in broken lines in this figure, this action will lift the tongue 124' out of the path of the cam member 127 so that the bolt will remain in locked position when the door is closed.

In Fig. 23 a construction is shown wherein the outside finger tip operated member is omitted. The spring 83 and the tongue 84 on the roll back are also omitted. In the modification movement of the roll back 74" is resisted only by the spring 81' so that the force required to operate the roll back is reduced. In the modification the construction and the operation of the arm 79', the control lever 85', the operating link 96' and the rocker arm 110' are the same as that previously described. The operation of the roll back is the same and the action of the electromagnetic speed control is unchanged as shown.

In this modified construction the bolt 28' and the manner in which it is operated and controlled is the same as that previously described. The latch shown in Fig. 23 with the inside finger tip controlled member disposed near the bolt edge of the door is particularly adapted for use on the rear doors of vehicles, since the push button is thus accessible both from the front seat (when it is used for locking and unlocking) and from the rear seat for locking, unlocking and releasing operations.

The further modified latch shown in Figs. 24 and 25 is particularly adapted for use on front doors and particularly such doors which include the "Fisher No-Draft Ventilation" or similar constructions wherein the window includes a stationary vertical member such as is indicated at 127 in the drawings and wherein a vertically pivoted window is disposed at 128 forward of the member 127 and a sliding window 129 is disposed in the rear of the member 127.

With the push button located near the vertical front member it is out of the way so that it will not catch on the driver's sleeve or be struck by the hand when it is hurriedly thrust out of the window for signaling purposes. Further the arrangement permits the driver to rest his left arm on the window sill in complete comfort and out of contact with the push button.

In the modification the inside push button 112" is mounted on a rod 113" the latter being pivotally connected to one arm of a bell crank 130 which is mounted to rotate with a shaft 131 supported on a plate 132. A spring 131' maintains the shaft 131 in normal position. The shaft 131 has a remote control handle 133 secured thereto while the other arm of the bell crank is connected to a bar 104" which is similar to the bar 104 previously described.

An L-shaped member 134 rotates about the shaft 131 and includes one arm which has a slotted tongue 135 thereon through which the rod 113" passes. The other arm of the member 134 is loosely connected as at 136 to a control lever 85" which is similar in construction and mounting as well as in operation to the control lever 85 previously described except that the upper portion of the control lever is omitted.

In the further modification a pivoted arm 79" is provided and is rocked by a roll back 74". The arm 79" is connected to an operating link 96" which corresponds to the operating link 96 previously described both in construction and operation. A rocker arm 110" is controlled by the armature 117" of a solenoid 118" which engages a tongue 116" in the manner previously described with the exception that the end of the rocker arm 110" remote from the solenoid is omitted.

The arm 79" is normally urged against the roll back by a spring 137 shown as mounted on the pivot 138 which supports the arm 79" and the rocker arm 110". This spring includes a long arm 139 which engages a tongue 140 on the arm 79" and also includes an arm 142 which engages a pin 143 on the rocker arm 110". The construction is such that when the arm 79" is rocked either by the remote control or the roll back and the armature is out of the path of the rocker arm the latter will swing freely with the arm 79" due to the engagement of the pin 143 and the portion 142 of the spring.

When, however, movement of the rocker arm 110" is prevented by the armature 117" motion of the arm 79" will be opposed by the portion 142 of the spring as well as the portion 139 thereof and as a result a much greater force will be required to rock the arm 79" and thus effect release of the bolt.

The bolt construction and operation in the modification shown in Figs. 24 and 25 is the same as that previously described.

In operation of the further modification the bolt may be locked against release by a key which shifts the control lever 85" to the position shown in Fig. 25, or the push button 112" may be moved laterally to secure the same result.

When the vehicle is at rest and the latch is in unlocked position, downward pressure on the push button will rock the arm 79" and as the armature would under this condition permit the rocker arm 110" to shift, the arms 79" and 110" would move together with only the arm 139 of the spring and the remote control spring 131' opposing the action. The same result would be obtained by shifting the remote control handle 133.

If the latch is locked the bolt may be released by a simple manipulation of the handle 133 or by manipulating the push button first to unlocked position and then to releasing position.

If the vehicle is in motion operation of the remote control handle or the push button will cause the tongue 116" to engage the armature 117" thus limiting the motion of the rocker arm 110". To move the arm 79" when motion of the rocker arm 110" is arrested requires that the arm 142 of the spring be flexed and this arm 142 is so arranged that it can be flexed only when considerable force is applied by the hand upon the handle 133 and the force applied by the finger pressure on the push button 112" would not be sufficient to release the bolt.

In the further modification the actuation of the latch by the outside door handle which would require considerable force when the vehicle is running is readily accomplished when the vehicle is at rest.

In order to aid in reading the claims and applying them to the structures shown herein and without limiting the claims to the detailed construction shown and described it will be understood that the expression "finger tip controlled means" or similar expressions refer to means which can be operated by light pressure such as might be readily exerted without undue effort by the tip of the average person's finger or the equivalent pressure, and that the expression "hand operated control means" refers to means which can be operated only by a pressure which is greater than can readily be produced by the tip of the average person's fingers and refers to control means which requires such pressure that the act would not be performed in what might be termed to be an unconscious manner.

It will be understood that the finger tip controlled means and the hand operated control means may be a single member operable under certain conditions by finger tip pressure and under other conditions only by harder hand operated pressure.

The "speed control means" or similar expressions used herein refers to means which is subject to, or under control of, the speed of the vehicle while the expression "bolt release means" or similar expressions refers to means the operation or actuation of which will free the bolt so the door may be opened.

The expressions "inside finger tip controlled means" and "outside finger tip controlled means" or similar expressions refer to means accessible from within and to means accessible from without the vehicle respectively, although in some of the broader claims the expression "finger tip controlled means" refers to such means regardless of whether it is within or without the vehicle.

The expression "outside hand operated control means" refers to such means accessible from without the vehicle while the expression "inside hand operated control means" refers to such means accessible from within the vehicle, such for instance as the member frequently termed the "remote control". In some claims the expression "hand operated control means" refers to such means regardless of its location.

In the broader claims the expression "control means" or similar expressions refer to such means regardless of whether it is finger tip controlled or is hand operated and without regard to its location. The expression "lock" or "locking means" refers to a construction the operation of which to locked position will prevent the performance of certain functions of the latch such as the release of the latch bolt.

Having thus described my invention I claim:

1. In an automotive vehicle door latch, a bolt, outside finger top controlled, vehicle speed influenced, means operable to release the bolt, outside hand operated control means to release the bolt and a single means operable from the exterior of the vehicle to render both outside control means ineffective to release the bolt.

2. In an automotive vehicle door latch, a bolt, inside vehicle speed controlled finger tip operated means to release the bolt, outside hand operated control means operable independently of the finger tip operated means to release the bolt and a single member operable from within the vehicle to either release the bolt or to the outside control means in non-releasing position.

3. In an automotive vehicle door latch, a bolt, outside, vehicle speed influenced, finger tip controlled means operable to release the bolt, and means operable from within and from without the vehicle to render the outside finger tip controlled means ineffective to release the bolt.

4. In an automotive vehicle door latch, a bolt, outside means operable to release the bolt, inside hand operated control means and inside finger tip control means to release the bolt, means exterior of the vehicle to render the outside means and the inside finger tip control means ineffective to release the bolt while permitting operation of the inside hand operated means and means to render all control means effective to release the bolt after the latter has been released by the inside hand operated control means.

5. In an automotive vehicle door latch, a bolt, outside, vehicle speed controlled, finger tip operated means operable to release the bolt, outside hand operated control means operable independent of the finger tip means to release the bolt, means accessible from without the vehicle to render both outside control means ineffective to release the bolt and means operable from within the vehicle to render both outside control means again effective to release the bolt after they have been rendered ineffective.

6. In an automotive vehicle door latch, a bolt, outside, vehicle speed controlled, finger tip actuated means for releasing the bolt, outside hand operated control means operable independent of the finger tip means for releasing the bolt and a single means accessible from the exterior of the vehicle and operable to render both outside control means ineffective to release the bolt.

7. In an automotive vehicle door latch, a bolt, inside and outside finger tip controlled means to release the bolt, inside hand operated control means coacting with a portion of the finger tip controlled means to release the bolt and a single means exterior of the vehicle to render both finger tip controlled means ineffective to release the bolt.

8. In an automotive vehicle door latch, a bolt, means to mount the bolt for movement to engaged and released positions, means to release the bolt, and an electro-magnet independent of the bolt and one or more circuits therefor including a vehicle speed controlled circuit closing member and a key operated member independent of the bolt for governing actuation of the release means.

9. In an automotive vehicle door latch, a bolt, outside, vehicle speed controlled, finger tip operated means operable to release the bolt, outside hand operated means, operable independent of the finger tip operated means, to release the bolt, locking means exterior of the vehicle to render both outside release means ineffective to release the bolt and manually operated means within the vehicle to actuate the locking means to thereby render both outside release means ineffective to release the bolt.

10. In an automotive vehicle door latch, a bolt, inside and outside finger tip controlled, vehicle speed influenced, means operable to release the bolt, and means operable from within and without the vehicle to render both the inside and the outside finger tip controlled means ineffective to release the bolt.

11. In an automotive vehicle door latch, a bolt, outside, vehicle speed controlled, finger tip actuated means to release the bolt, outside hand operated control means, operable independent of the finger tip actuated means to release the bolt and inside manually controlled means operable to render both outside control means ineffective to release the bolt.

12. In an automotive vehicle door latch, a bolt, lock controlled release means accessible from without the vehicle and operable at all times when the means is unlocked to release the bolt, means accessible from inside the vehicle and operable at all times to release the bolt under application of a heavy force and vehicle speed controlled means to render the inside means operable, under application of a light force, to release the bolt.

13. In an automotive vehicle door latch, a bolt, outside, vehicle speed controlled, finger tip operated means operable to release the bolt, inside and outside hand operated control means, operable independent of the finger tip means, to release the bolt, means exterior of the vehicle and operable to render both outside control means ineffective to release the bolt while permitting operation of the inside hand operated control means, and means to render both outside control means again effective to release the bolt after the latter has been released by the inside hand operated control means.

14. In an automotive vehicle door latch, a bolt, means within and without the vehicle and operable to release the bolt, speed influenced means and operable when the vehicle speed exceeds a certain rate to render the inside means ineffective to release the bolt upon the application of a light force while at all times permitting release of the bolt upon application of a heavy force and means independent of vehicle speed to render the outside means ineffective to release the bolt.

15. In an automotive vehicle door latch, a bolt, vehicle speed controlled, finger tip operated means to release the bolt, hand operated means operable independent of the finger tip operated means to release the bolt, and manually operated means operabe from within the vehicle to render both means ineffective to release the bolt.

16. In an automotive vehicle door latch, a bolt, outside vehicle speed controlled, finger tip actuated means operable to release the bolt, inside control means to release the bolt, locking means to render the outside control means ineffective to release the bolt while permitting operation of the inside control means to release the bolt, and means to again render the outside control means effective to release the bolt after the latter has been released by the inside control means.

17. In an automotive vehicle door latch, a bolt, outside control means operable to release the bolt, inside vehicle speed controlled means operable to release the bolt, means to render the outside control means ineffective to release the bolt, and means whereby the operation of the inside control means renders the outside control means again effective to release the bolt.

18. In an automotive vehicle door latch, a bolt, outside finger tip controlled means subject to vehicle speed and operable to release the bolt, inside hand operated control means operable independent of the outside finger tip means to release the bolt, locking means exterior of the vehicle to render the outside finger tip controlled means ineffective to release the bolt, means operable from inside the vehicle to render the outside finger tip controlled means ineffective to release the bolt, and means whereby the operation of the inside hand operated control means or the operation of the locking means renders the outside finger tip controlled means again effective to operate the bolt.

19. In an automotive vehicle door latch, a bolt, outside finger tip controlled means subject to vehicle speed and operable to release the bolt, inside hand operated control means operable independent of the outside finger tip means to release the bolt, means exterior of the vehicle to render the outside finger tip controlled means ineffective to release the bolt, and means whereby the operation of the inside hand operated control means or the operation of the exterior means renders the outside finger tip controlled means again effective to release the bolt.

20. In an automotive vehicle door latch, vehicle speed controlled means operable to release the bolt, and means other than the vehicle speed control means to prevent actuation of the release means, the bolt release means including means to actuate the preventing means to nonpreventing position.

21. In an automobtive vehicle door latch, a bolt, outside means operable to release the bolt, means independent of speed and operable from within the vehicle to render the releasing means ineffective to release the bolt, vehicle speed controlled means coacting with the means independent of speed to render the releasing means ineffective to release the bolt, and means within the vehicle and operable at all times to release the bolt.

22. In an automotive vehicle door latch, a bolt, outside finger tip controlled means operable to release the bolt, outside hand operated control means to release the bolt, means within the vehicle to release the bolt, lock controlled means to render both outside means ineffective to release the bolt and vehicle speed controlled means coacting with the lock controlled means to render both outside control means ineffective to release the bolt.

23. In an automotive vehicle door latch, a bolt, means accessible outside the vehicle and operable to release the bolt, vehicle speed controlled means operable within the vehicle to release the bolt, means exterior of the vehicle to render the outside means ineffective to release the bolt, and means operated by movement of the inside release means to render the outside means ineffective to operate the bolt.

24. In an automotive vehicle door latch, a bolt, inside and outside finger tip controlled means operable to release the bolt, outside hand operated control means to release the bolt, lock operated means to render both outside control means and the inside finger tip operated control means ineffective to release the bolt and vehicle speed controlled means coacting with the lock operated means to render the outside finger tip controlled means ineffective to release the bolt when the vehicle speed exceeds a certain rate.

25. In an automotive vehicle door latch, a bolt, inside and outside finger tip controlled means operable to release the bolt, inside and outside hand operated control means to release the bolt, means exterior to the vehicle to render both outside control means ineffective to release the bolt while permitting operation of the inside hand operated control means and means to render the outside finger tip controlled means and the outside hand operated control means again effective to release the bolt after the latter has been released by the inside hand operated control means, inside manually operated means coacting with the exterior means to render both outside control means ineffective to release the bolt, and vehicle speed controlled means to render the inside and outside finger tip control means ineffective to release the bolt.

26. In an automotive vehicle door latch, a bolt, outside means operable to release the bolt, vehicle speed controlled means and outside lock controlled means, and means whereby the last two means render the outside control means ineffective to release the bolt and means within the vehicle and operable at all times either to release the bolt or to render the outside means ineffective to release the bolt.

27. In an automotive vehicle door latch, a bolt movable to engaged and released positions, inside and outside means operable to release the bolt, speed controlled means operable when the vehicle speed exceeds a certain rate to render the inside means ineffective to release the bolt while at all times permitting release of the bolt by operation of the outside means and other means independent of vehicle speed to render the outside means ineffective to release the bolt.

28. In an automotive vehicle door latch construction, a bolt movable to engaged and to released positions, hand operated means and finger tip operated means without the vehicle and independently operable to release the bolt, vehicle speed controlled means operable from within the vehicle to release the bolt, and means including a member accessible from within and a member accessible from without the vehicle and operable to prevent actuation of the release means without the vehicle while permitting operation of the release means within the vehicle.

29. In an automotive vehicle door latch, a bolt movable to engaged and released positions, inside and outside hand operated means operable to release the bolt, finger tip operated, vehicle speed controlled means to release the bolt operable from without the vehicle, lock means for rendering the outside hand operated means and the finger tip operated means ineffective to release the bolt, means whereby movement of the bolt to engaged position normally releases the locking means, control means inside the vehicle for operating the locking means, and means actuated by the joint operation of the outside hand operated means and the inside control means for rendering movement of the bolt to engaged position ineffective to release the locking means.

30. In an automotive vehicle door latch including a bolt movable to advanced and released positions, means to advance the bolt, finger tip actuated means operable to release the bolt, hand actuated means operable to release the bolt, vehicle speed influenced means for controlling operation of the finger tip actuated means, lock means to render operation of the hand operated means ineffective to release the bolt, and means to render the finger tip operated means ineffective to release the bolt under all speed conditions when the hand actuated means is rendered ineffective to release the bolt, key controlled means operable from without the vehicle after the lock means has rendered the hand operated means ineffective to again render the hand operated means effective to release the bolt and to again render the finger tip actuated means subject to speed conditions.

31. In an automotive vehicle construction, a door member, a frame for the door member, a resilient striker on the frame the outer face of the striker being engageable by the door, a bolt on the door member movable to engaged position against the inner face of the striker and means to cause the door member to move towards the frame to thereby compress the striker between the door member and the bolt.

32. In an automotive vehicle door latch, a bolt, outside, vehicle speed controlled, finger tip operated, means operable to release the bolt, outside hand operated control means independent of vehicle speed and operable to release the bolt, and a single means operable from within the vehicle to either release the bolt or to render both outside means ineffective to release the bolt.

33. In an automotive vehicle door latch, a bolt, vehicle speed controlled, finger tip operated, means and hand operated means independent of vehicle speed and each operable to release the bolt, and manually operable means operable from a normal position from within the vehicle to either release the bolt or to render both of the first two mentioned means ineffective to release the bolt.

34. In an automotive vehicle door latch, a bolt, outside, vehicle speed controlled, finger tip operated, means to release the bolt, outside hand operated control means independent of vehicle speed and operable to release the bolt and inside manually controlled means operable to one position to release the bolt and operable to another position to render both outside control means ineffective to operate the bolt.

35. In an automotive vehicle door latch, a bolt movable to engaged and to released positions, a toggle which when straightened moves the bolt to engaged position and when broken moves the bolt to released position, means to straighten the toggle and means subject to vehicle speed and operable to break the toggle.

36. In an automotive vehicle door latch, a bolt, means to movably mount the bolt, a toggle, means whereby straightening of the toggle moves the bolt, means to straighten the toggle, means to break the toggle and thereby release the bolt and means energized by door movement for actuating the breaking means.

37. In an automotive vehicle door latch, a bolt movable to advanced position, toggle means operable upon straightening to shift the bolt across its path after it has advanced, means to straighten the toggle, means to prevent straightening of the toggle until after the bolt has advanced, means to release the bolt and means to break the toggle as the bolt is released.

38. In an automotive vehicle door latch, a bolt, means to movably mount the bolt, a toggle adapted to be straightened to move the bolt, means to straighten the toggle, means operated by door movement to energize the toggle straightening means, means to break the toggle and means operated by door movement for actuating the breaking means.

39. In an automotive vehicle door latch, a bolt movable to engaged and to released positions, a spring for urging the bolt to engaged position, a movable abutment, means whereby movement of the abutment in one direction moves the bolt to disengaged position, a spring urging the abutment in the one direction and tensioned when the abutment is moved in a reverse direction, means to move the abutment in spring tensioning direction, means normally preventing movement of the abutment in said one direction, and means subject to vehicle speed to free the abutment.

40. In an automotive vehicle door latch, a bolt, control means operable from without the vehicle to release the bolt, means controlled exterior of the vehicle to render the outside control means ineffective to release the bolt and vehicle speed controlled means coacting with the exterior controlled means and operable to render the outside control means ineffective to release the bolt, and inside manually controlled means coacting with the exterior controlled means and independent of vehicle speed to render the outside control means ineffective to release the bolt, and means within the vehicle and operable at all times to release the bolt.

41. In an automotive vehicle door latch, a bolt movable to released and engaged positions, and vehicle speed controlled bolt releasing means operable to a preliminary non-releasing position regardless of the speed of the vehicle and operable to a final bolt releasing position only when the vehicle speed is less than a certain rate.

42. In an automotive vehicle door latch, a bolt movable to released and engaged positions, means to release the bolt, means to normally prevent actuation of the release means, vehicle speed controlled means operable to a position to first free the preventing means and thereafter operable to a final position to release the bolt.

43. In an automotive vehicle door latch, a bolt movable to released and engaged positions, means to release the bolt, means to normally restrain actuation of the release means, and release means operable to a preliminary position to free the restraining means and operable to a final position to release the bolt, and vehicle speed controlled means preventing movement of the release means to final bolt releasing position when the vehicle speed exceeds a certain rate.

44. In an automotive vehicle door latch, a bolt movable to released and engaged positions, means to release the bolt, means to normally prevent actuation of the release means, actuating means operable first to a preliminary and thereafter to a bolt releasing position, and speed influenced means for freeing the preventing means when the actuating means is in the preliminary position and when the vehicle speed is less than a certain rate to thereby render the actuating means free for movement to bolt releasing position.

45. In an automotive vehicle door latch, a bolt movable to released and engaged positions, means to release the bolt, means to normally restrain actuation of the release means, and pivoted finger tip operated means operable in one direction about its pivot to a preliminary position to free the restraining means and thereafter operable about the same pivot to a final position to release the bolt.

46. In an automotive vehicle door latch, a bolt movable to engaged and released positions, outside means operable to release the bolt, finger tip operated, vehicle speed controlled means operable to release the bolt, locking means for conditioning the outside means so that it is ineffective to release the bolt, means whereby movement of the bolt to engaged position normally moves the locking means to unlocked condition, control means for shifting the locking means, and means actuated by the joint operation of the outside means and the control means for rendering movement of the bolt to engaged position ineffective to move the locking means to unlocked condition.

BURNIE J. CRAIG.

CERTIFICATE OF CORRECTION.

Patent No. 2,187,936.                                                January 23, 1940.

BURNIE J. CRAIG.

It is hereby certified that error appears in the printed specification of the above numbered patent requiring correction as follows: Page 5, first column, line 21, for the word "arms" read --arm--; page 6, first column, line 1, for the reference numeral "17" read --117--; page 7, second column, line 5, claim 1, for "top" read --tip--; line 17, claim 2, after "to" second occurrence, insert --place--; page 8, first column, line 62, claim 15, for "operabe" read --operable--; same page, second column, line 64, claim 23, after "operable" insert --from--; and that the said Letters Patent should be read with this correction therein that the same may conform to the record of the case in the Patent Office.

Signed and sealed this 7th day of May, A. D. 1940.

(Seal)

Henry Van Arsdale,
Acting Commissioner of Patents.